May 17, 1960     G. A. BEASLEY     2,936,674
METHOD OF MAKING A MULTIFOCAL OPHTHALMIC LENS
Filed Nov. 8, 1952
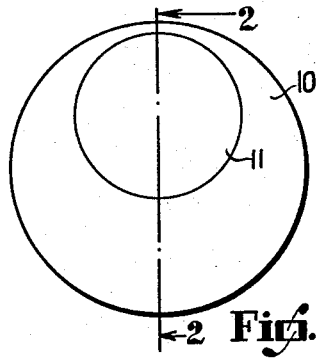
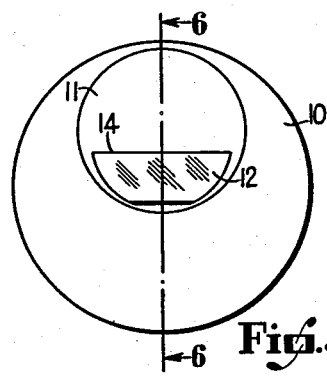
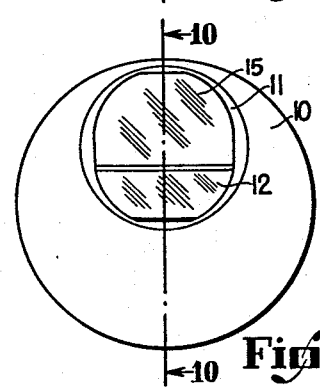
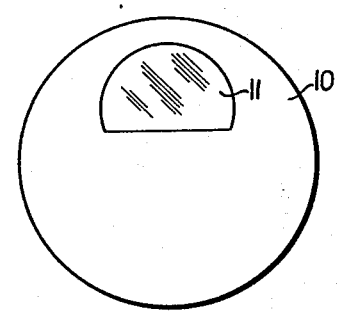
INVENTOR.
George A. Beasley
BY
ATTORNEY

United States Patent Office 2,936,674
Patented May 17, 1960

2,936,674

METHOD OF MAKING A MULTIFOCAL OPHTHALMIC LENS

George A. Beasley, Dayton, Ohio, assignor to The Univis Lens Company, Dayton, Ohio, a corporation of Ohio Application November 8, 1952, Serial No. 319,566

2 Claims. (Cl. 88—54)

My invention relates to multifocal ophthalmic lenses and methods of making the same. It has to do particularly with the processing of a minor optical field having a surface curvature different from the surface curvature of the major optical field in which the minor optical field is located.

One of the objects of this invention is to provide an inexpensive method of making a multifocal lens having a desirable, preferably straight, line division between different optical surfaces adjacently located on the same side of the lens.

Another object of this invention is to provide a method of making a multifocal lens of light weight by employing a novel construction for minor optical fields.

Another object of this invention is to provide an inexpensive multifocal lens that can be made in any usable range of base curves and additions without the presence of color aberrations.

In its preferred embodiment, my invention contemplates the making of a multifocal lens by forming a minor optical field in a major piece of optical glass. A button segment is formed of a minor piece of optical glass with the segment being of such size and shape that it can be fused or otherwise permanently secured to the surface of the minor optical field to cover only a portion of the area thereof. This button segment is of the same refractive index as the major blank so that part of its outline will later disappear upon grinding a finished surface on the face of the major blank. A second button segment is formed of optical glass and temporarily cemented to the balance of the area of the minor optical field. The face of the major piece of optical glass having the segments secured thereto is then ground and polished in the conventional manner. The second mentioned segment is really a dummy lens provided to protect the portion of the minor optical field area that is covered and to protect the edge of the permanently fused first mentioned segment during the grinding and polishing operation. After the surface carrying the button segments is finished, the dummy lens is removed from the major piece of glass to expose the portion of the minor field surface that it temporarily covered and protected.

Further objects and advantages of the present invention will be apparent from the following description, reference being had to the accompanying drawings wherein a preferred form of embodiment of the invention is clearly shown.

In the drawings:

Fig. 1 is a front elevational view of a main blank of optical glass having a minor field optical surface ground on its front face;

Fig. 2 is a sectional view taken on line 2—2 of Fig. 1;

Fig. 3 is a front elevational view of a button segment formed in accordance with the present invention;

Fig. 4 is a side sectional view of the button segment of Fig. 3;

Fig. 5 is a front elevational view of the main blank showing the button segment of Fig. 3 secured to the minor field optical surface;

Fig. 6 is a sectional view taken on line 6—6 of Fig. 5;

Fig. 7 is a front elevational view of a second button segment formed in accordance with the present invention;

Fig. 8 is a side sectional view of the button segment of Fig. 7;

Fig. 9 is a front elevational view of the main blank showing both of the button segments secured to the minor field optical surface;

Fig. 10 is a sectional view taken on line 10—10 of Fig. 9;

Fig. 11 is a sectional view of the elements of Fig. 10 showing the optical surface formed on the main blank and the segments;

Fig. 12 is a side sectional view of one of the button segments after it has been removed from its secured position on the minor field optical surface;

Fig. 13 is a side sectional view of the main blank after one of the button segments has been removed; and Fig. 14, is a front elevational view of the main blank of Fig. 13.

Referring to the drawing and more particularly to Figs. 1 and 2, there is shown a main optical blank 10. A minor field optical surface 11 has been formed in the front face thereof. The next step in my process comprises forming a rear surface 13 on a button segment 12. The surface 13 is finished to complement the curvature of the minor field surface 11. When segment 12 is positioned on the minor field, it covers only a portion of that surface 11. Button segment 12, which may be best seen in Figs. 3 and 4, is preferably provided with a plane top or edge surface 14. The button segment 12 is then secured to the minor field surface 11 by attaching it thereto, or preferably by fusing it into the glass of main blank 10 so that it essentially becomes a permanent part of the main blank. Figs. 5 and 6 show the button 12 secured in place, and it should be noted that the side surface 14 is horizontally disposed relative to the position it will occupy in a finished lens. The surface 14 of the button 12 may be formed to various curvatures but is preferably made to intersect the minor field surface in a straight line when viewed from the front, as seen in Fig. 5, so as to make the full lateral extent of minor or major field available as soon as the line of sight shifts from one field to the other. Further, since the edge 14 of the button 12 is placed nearer the center of the minor field, the optical jump on passing from one field to the other is minimized.

The next succeeding step in my process entails the forming of a rear surface 17a on a second button segment 15 with such rear surface adapted to register with and cover most of the remaining uncovered portion of the minor field surface 11, and with a plane bottom or edge surface 16a adapted to register with the first mentioned top surface 14 provided on the other button segment 12. Figs. 7 and 8 are front and side views, respectively, of the button segment 15 which is next temporarily secured to the upper portion of minor field surface 11 so that the flat top surface 14 and the bottom surface 16a of the respective button segments 12 and 15 are in abutting relation as seen in Figs. 9 through 11. The resulting composite blank is then finished in the conventional manner by grinding the optical surface 17 on the front face 16 of blank 10. The surface 17 extends continuously across the front face of blank 10 and across the button segments 12 and 15. The optical surface 17 may be best seen in Figs. 11 and 13 and the portions, which are ground away when surface 17 is formed, are outlined with dotted lines in Fig. 11. At this point, it may be seen that the button segment 15 was temporarily secured to the minor field surface 11 to protect such surface and to protect the edge 14 of button 12 during the grinding and finishing operations employed in forming optical surface 17. Thereafter, the remaining portion of button segment 15 is removed from its secured relationship with minor field surface 11 to expose again such finished optical surface which will constitute the minor field for a multifocal lens which may be made from a semi-finished blank such as is shown in Fig. 14.

The remaining portion of edge 14 separates the major and minor optical fields of the lens. Fig. 13 exaggerates the size of edge 14 relative to the rest of the lens for the purpose of clarifying the drawings.

It should be noted that only one embodiment of the present invention has been presented in detail and that the method outlined results in a semi-finished blank for making a bifocal lens. Obviously the same invention can be employed for making multifocal lenses having more than two separate fields.

In conclusion, it should be noted that the process of manufacture herein employed consists only of relatively simple grinding operations performed on standard blanks of optical glass. The result is a multifocal lens blank having a minor field separated from a major field by substantially a straight line, or by some other preferable dividing line that will be optically less objectionable than an arcuate dividing line such as is formed at the edge of a conventionally ground minor field optical surface. A semi-finished optical blank formed in accordance with the teachings of the present invention will provide an inexpensive multifocal lens which presents no noticeable obstructions to the eye, and which essentially eliminates the objectionable prismatic jump which was heretofore encountered in inexpensive lenses when the eye was shifted from one optical field to another.

While the form of embodiment of the present invention as herein disclosed constitutes a preferred form, it is to be understood that other forms might be adopted, all coming within the scope of the claims which follow.

I claim:

1. Those steps in the method of making a multifocal lens comprising, forming a finished minor field optical surface on one of the two sides of a major piece of lens medium, struck from an arc whose center of curvature is on one of the two sides of the said major piece; forming, in a minor piece of lens medium of the same index of refraction as the major piece, a button segment with a surface adapted to complement said minor field surface; placing said segment on said finished minor field surface to cover a part only of said field surface, with the complementing surfaces in abutting relationship; welding said segment, so placed, to said major piece; forming a finished surface, of different curvature than the first-mentioned finished surface and struck from an arc whose center of curvature is on the same side of the major piece as the first-mentioned center of curvature, and which second-mentioned curvature is on the same side of the lens as the first-mentioned surface including finishing across the button segment and the area immediately about the said segment.

2. Those steps in the method of making a multifocal lens comprising, forming a finished minor field optical surface of convex curvature on the convex side of a major piece of lens medium; forming, in a minor piece of lens made of the same index of refraction as the major piece, a button segment with a surface adapted to complement said minor field piece; placing said segment on said finished minor field surface to cover a part only of said field surface, with the complementing surfaces in abutting relationship; welding said segment, so placed, to said major piece; forming a finished surface, of different convex curvature than the first-mentioned finished surface, on the convex side of the major piece including finishing across the button segment and the area about the said segment.

References Cited in the file of this patent
UNITED STATES PATENTS

| 1,221,967 | Bugbee | Apr. 10, 1917 |
| 1,267,821 | Styll | May 28, 1918 |
| 1,340,021 | Cross | May 11, 1920 |
| 2,049,095 | Tillyer | July 28, 1936 |
| 2,054,166 | Reh | Sept. 15, 1936 |
| 2,183,885 | Heavyside | Dec. 19, 1939 |
| 2,274,142 | Houchin | Feb. 24, 1942 |
| 2,274,143 | Houchin | Feb. 24, 1942 |

FOREIGN PATENTS

| 113,191 | Great Britain | Feb. 14, 1918 |